Aug. 11, 1942.   F. MARTINDELL ET AL   2,292,840
METHOD OF AND APPARATUS FOR CONTINUOUSLY FOLDING STRIP MATERIAL
Filed March 10, 1939   4 Sheets-Sheet 2
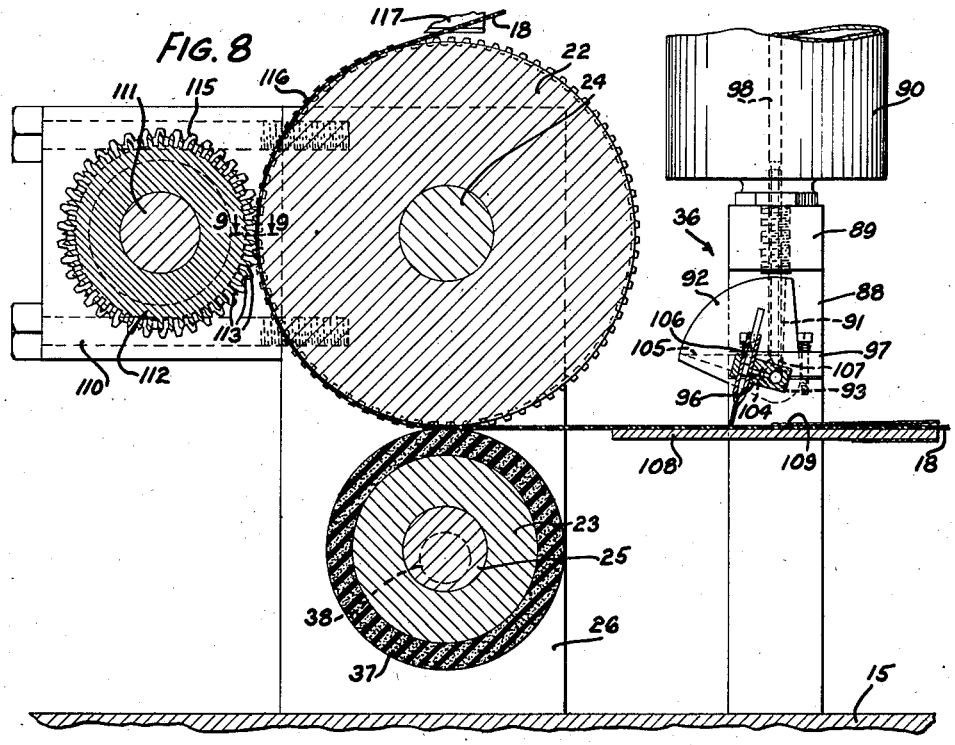
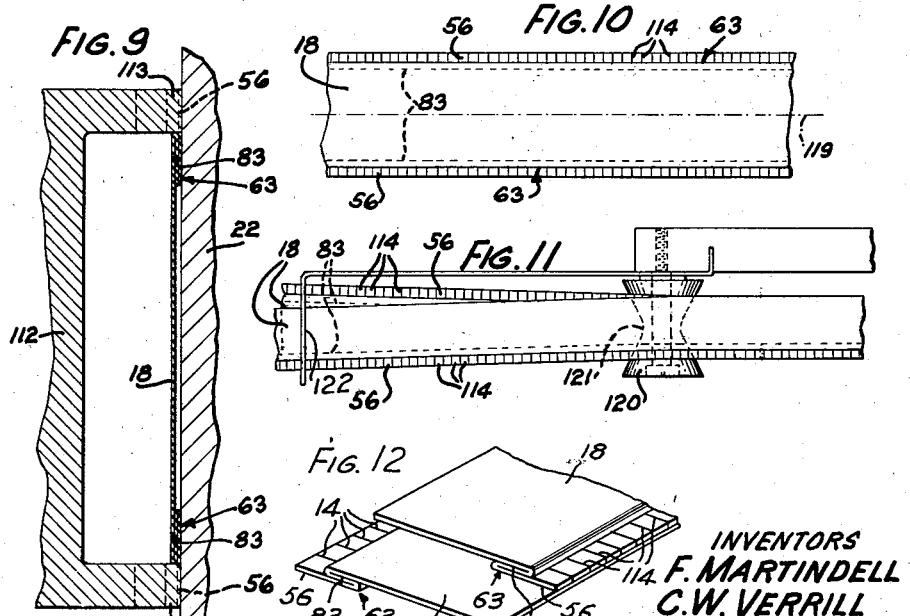
INVENTORS
F. MARTINDELL
C. W. VERRILL
BY Emery Robinson
ATTORNEY

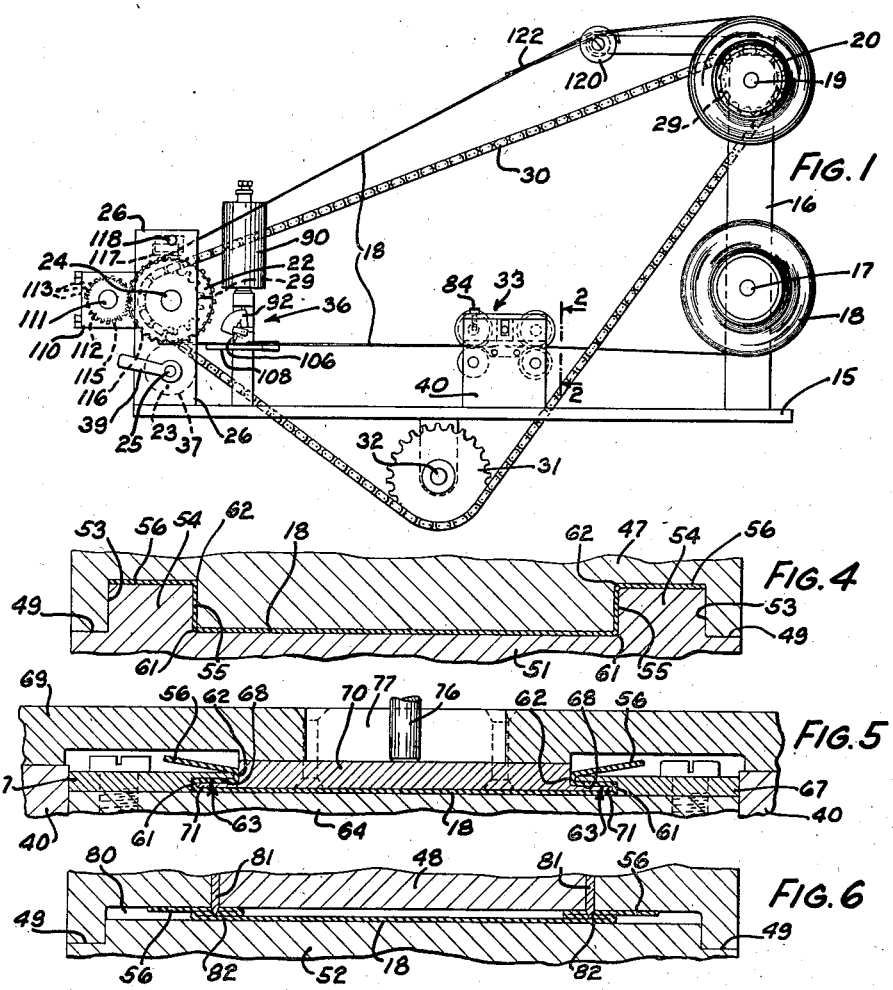

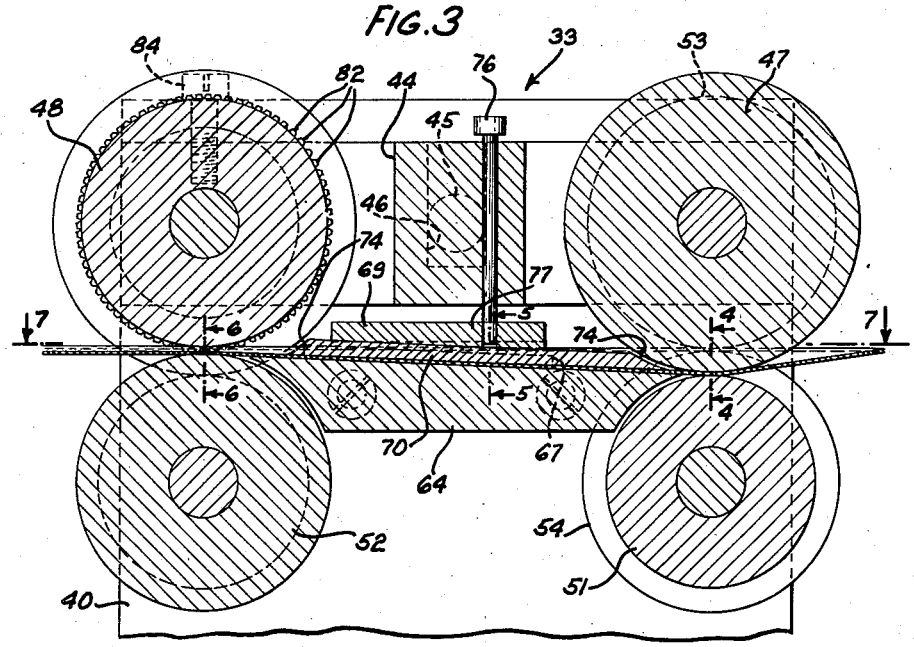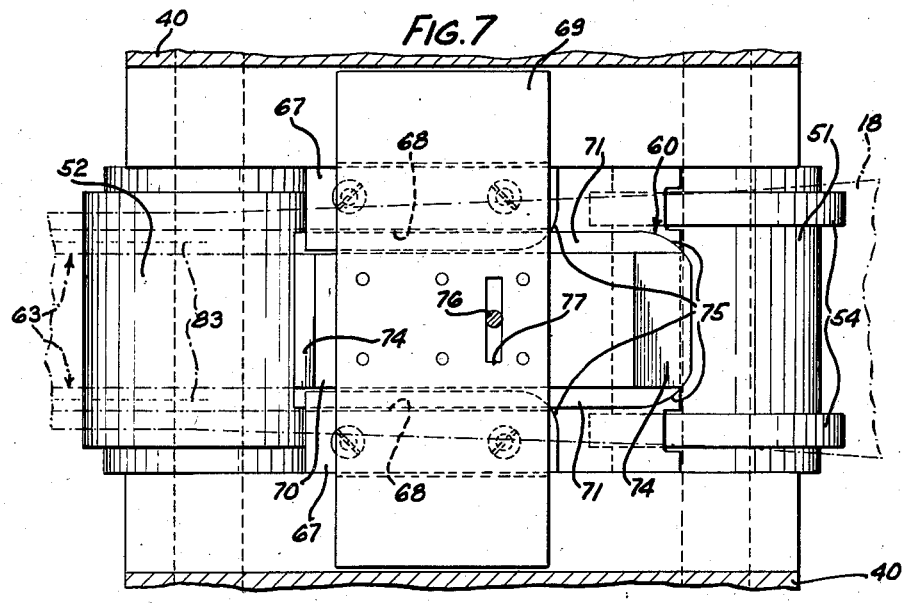

Aug. 11, 1942.    F. MARTINDELL ET AL    2,292,840
METHOD OF AND APPARATUS FOR CONTINUOUSLY FOLDING STRIP MATERIAL
Filed March 10, 1939    4 Sheets-Sheet 4
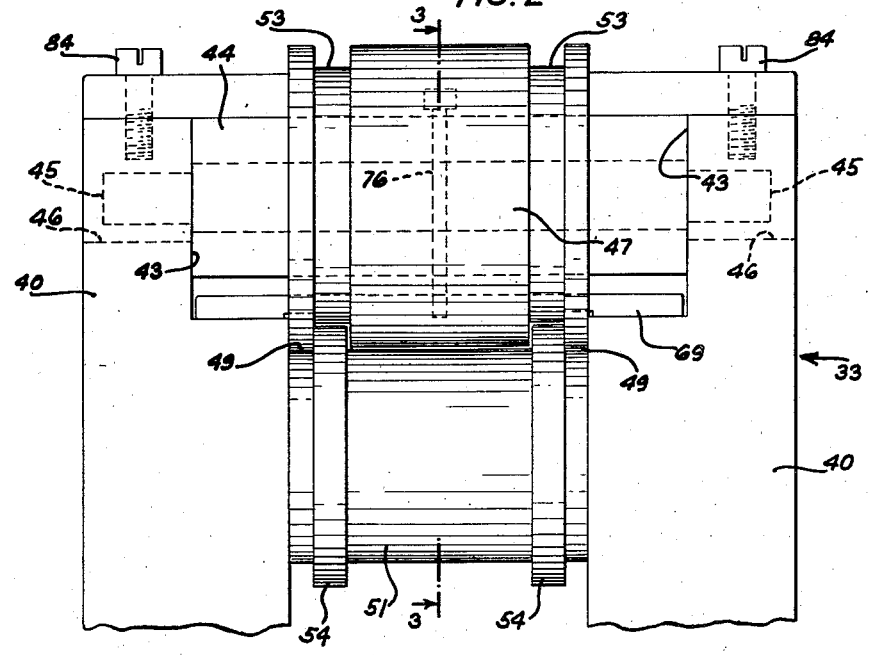
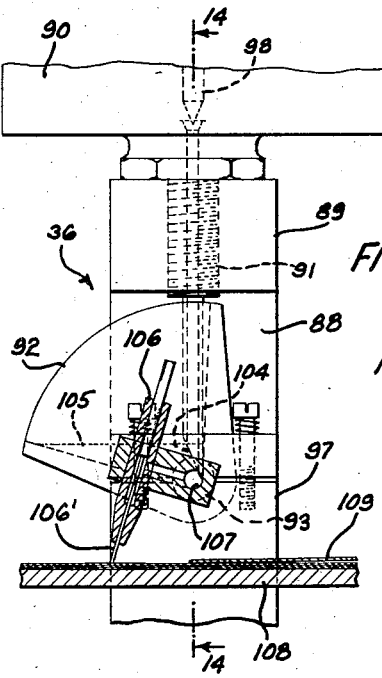
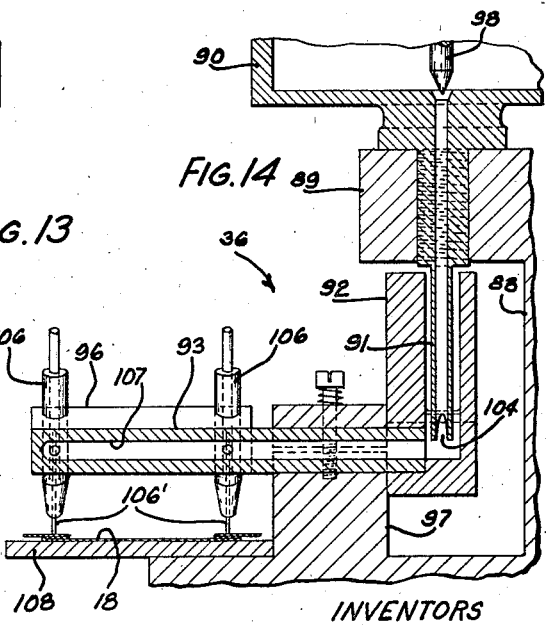
INVENTORS
F. MARTINDELL
C. W. VERRILL
BY Emery Robinson
ATTORNEY Patented Aug. 11, 1942

2,292,840

UNITED STATES PATENT OFFICE 2,292,840

METHOD OF AND APPARATUS FOR CONTINUOUSLY FOLDING STRIP MATERIAL

Frank Martindell, Western Springs, and Charles W. Verrill, Maywood, Ill., assignors to Western Electric Company, Incorporated, New York, N. Y., a corporation of New York Application March 10, 1939, Serial No. 260,942

4 Claims. (Cl. 270—93)

This invention relates to an apparatus for continuously folding strip material, and more particularly to an apparatus for folding and working continuous lengths of non-fibrous insulating material, from which insulators of the type disclosed in Patent No. 2,216,464 to C. W. Verrill of October 1, 1940, may be severed.

An object of the present invention is to provide an efficient and practical apparatus for continuously folding and working continuous lengths of strip material.

An apparatus embodying features of the invention for forming the above-referred-to type of insulators, comprises continuously operated means for withdrawing a strip of cellulose acetate material from a supply roll, means effective during the movement of the strip for forming, in opposite edge portions thereof, continuous N-shaped folds, for forming a line of perforations in two layers of material of each fold, for applying colored acetone, or any suitable solvent for the cellulose acetate material to each line of perforations to coalesce the layers of the folds and provide a colored line therealong, for pressing the folds to flatten them and spread the acetone, for laterally serrating the opposite edge portions outside the folds, for longitudinally cutting the folded and worked strip in half, for guiding the two strips laterally toward each other to cause an overlapping of the cut edges thereof, and finally simultaneously coiling the two overlapped strips together.

Other objects and advantages of this invention will more fully appear from the following detailed description taken in connection with the accompanying drawings, in which Fig. 1 is a side view of an apparatus embodying the features of the invention;

Fig. 2 is an enlarged fragmentary vertical section taken on the line 2—2 of Fig. 1;

Fig. 3 is an enlarged vertical section taken on the line 3—3 of Fig. 2;

Figs. 4, 5 and 6 are greatly enlarged fragmentary vertical detail sections taken on the lines 4—4, 5—5 and 6—6 of Fig. 3;

Fig. 7 is a plan section taken on the line 7—7 of Fig. 3;

Fig. 8 is an enlarged fragmentary vertical section partly in elevation of the left hand end of the apparatus as viewed in Fig. 1;

Fig. 9 is an enlarged fragmentary plan detail section taken on the line 9—9 of Fig. 8;

Fig. 10 is an enlarged plan view of the folded and worked strip before being longitudinally cut in half;

Fig. 11 is an enlarged fragmentary plan view of Fig. 1 showing the means for guiding the two folded and worked insulator strips laterally toward each other to cause an overlapping of their cut edges while being coiled together;

Fig. 12 is an enlarged perspective view of the two folded and worked overlapped insulator strips while being coiled together, the thickness of the material being exaggerated to clearly show the folds therein and relative position of the strips;

Fig. 13 is an enlarged fragmentary view of the solvent applying device shown at the right side of Fig. 8, and Fig. 14 is a fragmentary vertical section taken on the line 14—14 of Fig. 13.

Referring particularly to Fig. 1, the numeral 15 indicates a base having a standard 16 carrying a spindle 17 for supporting a coiled supply 18 of strip cellulose acetate material and a power driven spindle 19 for coiling up the two folded and worked strips initially drawn from the supply 18 in the form of a single strip.

It is to be understood that a suitable slip clutch (not shown) is arranged between the constant speed spindle 19 and a core 20 upon which the folded and worked strips are coiled, whereby the tension on the strips will remain substantially uniform as the coiled strip material increases in diameter. Also that a suitable braking means (not shown) is associated with the strip supply 18 to maintain the desired tension on the strip during its withdrawal from the supply. The slip clutch and braking means have not been illustrated and described in detail since they form no part of this invention and are not believed necessary to a full understanding thereof.

At the left end of the base 15 is a pair of cooperating rolls 22 and 23 carried by spindles 24 and 25, respectively, the spindles being journaled in spaced plates 26 fixed to the base 15. Each of the spindles 19 and 24 at their rear ends, as viewed in Fig. 1, has fixed thereto a sprocket wheel 29, the sprocket wheels being similar and driven by a sprocket chain 30 which in turn is driven from a sprocket wheel 31 fixed to a drive shaft 32 carried in a fixed bearing depending from the lower face of the base 15. The drive shaft 32 receives motion from a motor and associated speed reducing mechanism (not shown) whereby the spindles 24 and 19 are driven at a desired similar speed.

The roll 22 in cooperation with the roll 23 serves to draw the strip material from the supply 18, thence through a forming, folding and working mechanism indicated generally at 33 and past a solvent applying device indicated generally at 36, which mechanism and device will be referred to later. For the purpose of providing the necessary traction between the rolls 22 and 23, and a resilient pressure upon the folded strip as it advances between the rolls, the roll 23, which is freely rotatable upon its spindle 25, is fitted with a peripheral facing of rubber indicated at 37 (Fig. 8). To facilitate the threading of the strip material 18 between the rolls 22 and 23, in setting up the apparatus, the spindle 25, carrying the roll 23, is formed with eccentric portions 38 at opposite ends which are journaled in the plates 26, the forward eccentric portion of the spindle, as viewed in Fig. 1, being equipped with a handle 39 so that by rotating the handle the roll 23 and spindle 25 may be lowered or raised relative to the roll 22 to provide a suitable space therebetween for freely threading the material between the rolls and also to vary the resilient pressure upon the strip material during its advance by the rolls. During operation of the apparatus the spindle 25 is stationary and the roll 23 rotates thereon.

The strip forming, folding and working mechanism 33, referring to Figs. 1 to 7, inclusive, comprises a pair of spaced plates 40 provided with shouldered portions 43 (Fig. 2) at their upper ends between which is supported an H-shaped frame 44. To prevent the frame 44 from shifting in a horizontal direction and at the same time permitting it to be readily placed in a predetermined position or freely removed therefrom, the frame intermediate its ends carries a pair of pins 45 which slide fit in notches 46 formed in the plates 40. Freely journaled in opposite ends of the frame 44 are rolls 47 and 48 which peripherally engage, as indicated at 49, cooperating rolls 51 and 52, respectively. Intermediate the surfaces 49 of the rolls a suitable clearance space is provided for receiving the strip 18. Thus, during the forming, folding and working of the advancing strip 18 the sets of rolls 47 and 51 and 48 and 52 are caused to rotate by the advancement of the strip 18. The rolls 51 and 52 are freely journaled in the plates 40 below the rolls 47 and 48 and in vertical alignment therewith. Formed in the rolls 47 and 51 are cooperating pairs of aligned annular square cornered channels and shoulders 53 and 54, respectively, which serve to form the strip 18 adjacent each of its opposite longitudinal edges, as it is drawn between the freely journaled rolls, with a vertical portion 55 terminating in a horizontal edge portion 56, as shown in Fig. 4.

Immediately upon moving from between the rolls 47 and 51 the formed strip 18 is advanced through a folding device 60 carried between the plates 40 intermediate the sets of rolls 47 and 51 and 48 and 52, which is effective to progressively turn the opposite vertical and horizontal edge portions 55 and 56 about the points 61 and 62, respectively, into the shape shown in Fig. 5, thus providing at this point in the advance of the strip 18 an open N-shaped fold 63 comprising three layers of material along each longitudinal edge portion 56 of the strip, the latter comprising a single thickness of material outside the adjacent fold 63.

The folding device 60 comprises a bridge plate 64 (Figs. 3 and 5) which is fixed to the plates 40. Attached to the upper surface of the plate 64 are spaced folder plates 67 (Fig. 5) which are undercut along their inner opposed edges to provide channels, as indicated at 68. Supported upon opposite horizontal surfaces of the shouldered portions 43 of the plates 40 is a bridge plate 69 to the under surface of which is attached a folder plate 70, with which the advancing strip 18 first makes contact after leaving the rolls 47 and 51. Opposite sides of the plate 70 are formed with tongues 71, which freely extend into the channels 68 of the folder plates 67. The dimensions of the tongues 71 and the channels 68 and the space between the opposed upper and lower surfaces of the bridge plate 64 and plate 70 and the arrangement thereof are such that a suitable space is provided to snugly receive the strip 18 with the portions 55 and 56 formed thereon. Opposite ends of the folder plate 70 intermediate the tongues 71 are tapered, as indicated at 74 (Figs. 3 and 7), to permit them to extend in close proximity to the peripheral surfaces of the rolls 47 and 51 and 48 and 52 and the forward ends of the folder plates 67 and 70 are rounded, as indicated at 75, to freely permit the advancing strip 18 to enter the space between the plates and in the continued advance of the strip to progressively assume the shape shown in Fig. 5. The space between the lower surface of the bridge plate 69 and the upper surfaces of the folder plates 67 gradually diminishes from right to left, as viewed in Fig. 3, which serves to turn the edge portions 56 downward, as the strip is advanced, until when they leave the forming device 60 they are substantially horizontally disposed.

The bridge plate 69 with the attached folder plate 70 is held in a predetermined position between the sets of rolls 47 and 51 and 48 and 52 by means of a pin 76 freely carried in an aperture in the H-shaped frame 44 with its lower end entered in a slot 77 in the bridge plate, the slot extending parallel to the length of the plate. The plate 69, which rests on the opposite shouldered portions 43 of the plates 40, is slightly less in length than the distance between the vertical surfaces of the shouldered plate portions 43 (Fig. 7). Thus the arrangement permits the folder plate 70 to shift slightly back and forth between the plates 40 to adjust itself while the strip is being folded.

Upon leaving the folding device 60 the folded strip 18 is drawn between the cooperating rolls 48 and 52, the strip entering a space 80 provided between the peripherally engaged surfaces 49 of the rolls. The roll 48 includes a pair of disks 81 formed with spaced peripheral perforating blades 82 (Figs. 3 and 6) which are alined with the longitudinal center line of the folds 63 of the strip and as the strip is advanced between the rolls a line of perforations 83 (Figs. 7 and 10) is formed in the two upper layers of the material of each fold, as best shown in Fig. 6, the folds 63 at this point in their advance being pressed flat. In order to insure that the blades 82 will penetrate the two layers of material the H-shaped frame 44, which carries the rolls 48 and 47 which peripherally engage the rolls 52 and 51 at 49, is positively held in a fixed position at its left end (Fig. 3) by a pair of screws 84 extending through the frame and threaded into the plates 40.

In the continued advance of the strip 18 after being provided with the perforated folds 63, it is drawn past the colored acetone applying device 36 (Figs. 1, 13 and 14), by means of the rolls 22 and 23, during which, in the present embodiment, colored acetone, or other suitable solvent, is applied to the two lines of perforations 83 in the two upper layers of cellulose acetate material of the folds 63, which actually coalesces the adjacent layers of material.

The device 36 comprises a standard 88 disposed at the rear of the strip, as viewed in Figs. 1 and 13, and carried on the base 15. Supported upon the upper end of a forwardly extending horizontal arm 89 (Fig. 13) of the standard 88 is a main container 90 (Figs. 1, 13 and 14) for a supply of colored acetone. The container 90 at its lower end carries a feed tube 91 which extends through an aperture in the arm 89 and into an open triangular shaped container 92 to which is attached a forwardly extending conduit 93 having its forward end attached to and communicating with a chambered block 96. The conduit 93 is pivotally supported in a bearing block 97 which may be integral with the standard 88. For controlling the flow of acetone from the main container 90, which is normally closed to atmosphere, into the feed tube 91, a valve rod 98 is threaded into the container 90 at its upper end (Figs. 1, 13 and 14), the lower end of the rod being cone shaped and entered in the upper end of the feed tube. Thus by raising and lowering the rod 98 the flow of acetone into the tube 91 may be regulated. At its lower end the tube 91, which extends into the container 92, is cut at an angle as indicated at 104 and the normal level of the acetone in the container is shown at 105. The block 96 has mounted therein a pair of hollow acetone applying tips 106 which communicate with a chamber 107 in the block 96, the tips each including a wire nib 106' having an enlargement at its upper end which is frictionally held in the tip. The tips 106 are arranged in the block 96 so that they are alined with the lines of perforations 83 of the folds 63 and during the operation of the apparatus are arranged at the angle shown relative to the advancing strip 18 so that a small amount of colored acetone is applied continuously along the lines of perforations 83, the acetone seeping along the wire nib which fits the tip with a suitable clearance. During the threading of the strip 18 through the apparatus in preparing it for operation the tips 106, the block 96 and container 92 which are supported on the pivotal conduit 93 may be rotated clockwise with the conduit to space the tips 106 above the path of the strip. The strip 18 during its advance under the tips 106 is supported on a table member 108 fixed to the standard 88, the table carrying a guide and presser plate 109 effective to prevent the strip from appreciably shifting laterally and to hold the strip against the table while the acetone is being applied to the perforations 83 by the nibs 106'.

After the colored acetone is applied along the line of perforations 83 of the folds 63 the folded strip 18 passes between the drawing rolls 22 and 23 during which the folds 63 are further pressed and flattened and the colored acetone, which has seeped between the layers of the folded cellulose acetate material, is spread between and coalesces the layers and provides a colored line therealong. Journaled in a bearing block 110 fixed to the plates 26 (Fig. 8) is a spindle 111 to which is fixed a roll 112 between which and the roll 22 the folded strip passes after being pressed between the latter roll and the roll 23. The roll 112 has formed upon its periphery at opposite ends a plurality of cutting teeth 113 arranged to laterally serrate the opposite edge portions 56 of the strip, as indicated at 114 (Fig. 10), the serrations extending from the outer edges of the folds 63 to the outer edges of the strip. The relation between the cutting edges of the teeth 113 and the peripheral surface of the roll 22 is such that in serrating the edge portions 56 of the strip 18 the teeth do not engage the surface of the roll. The spindle 111 of the serrating roll 112 carries a gear 115 which meshes with a gear 116 fixed to the spindle of the power driven drawing roll 22, the arrangement being such that the peripheral speeds of the drawing and serrating rolls 22 and 112, respectively, are similar.

In the continued advance of the folded and serrated strip 18, it moves into engagement with a cutting blade 117 (Figs. 1 and 8) fixed to a rod 118 carried by and extending between the plates 26, the blade being so positioned that the strip 18 is longitudinally cut in half along the line indicated at 119 (Fig. 10), as it moves into engagement with and past the blade. The two similar folded strips 18 are then coiled together on the core 20 driven by the spindle 19 with their cut edges overlapping. To effect an overlapping of the advancing strips, the strips are overlapped and guided over a suitably journaled idler pulley 120 formed with a double frustum-cone shaped periphery 121 which, as the strips pass thereover, are maintained in overlapping relation and thus guided to and simultaneously coiled together on the driven core 20. In advance of the engagement of the strips 18 with the pulley 120 the strips are supported on a wire support 122.

The mode of operation of the apparatus is believed to be sufficiently set forth and to be clearly understood from the above detailed description without further description.

While the apparatus of this invention has been illustrated and described in connection with the manufacture of a particular article, it will be understood that the invention is capable of application to other types of articles and further is not to be limited to the specific embodiment herein illustrated and described, but is to be limited only by the scope of the appended claims.

What is claimed is:

1. In an apparatus for continuously forming sheet material to be cut into relatively short lengths to provide insulators for spool wound coils, a pair of feed rolls for moving the sheet of material, means for forming folds in the sheet of material spaced inwardly from opposite edge portions thereof comprising a pair of peripherally intermeshing bending rolls between which the sheet is drawn by the feed rolls for partially folding the material, and folder plates for completing the folds in the material, said plates having cooperating spaced tongues between which the partially folded sheet of material is drawn for completing the folds therein.

2. In an apparatus for continuously forming sheet material to be cut into relatively short lengths to provide insulators for spool wound coils, a pair of feed rolls for moving the sheet of material, means for forming N-shaped folds longitudinally in the sheet spaced inwardly from opposite edge portions thereof comprising a pair of intermeshing bending rolls between which the sheet is drawn by the feed rolls for partially folding the material, and folder plates for completing the folds in the material, said plates having spaced overlapping tongues between which the partially folded sheet of material is drawn for completing the folds therein.

3. In an apparatus for continuously forming sheet material, means for continuously moving the sheet material, means for forming folds in the sheet spaced inwardly from opposite edge portions thereof comprising a pair of intermeshing bending rolls between which the sheet is moved for partially folding the material, said bending rolls each having a central peripheral portion, the central portion of one of said rolls terminating adjacent each end in an annular channel providing peripheral portions of smaller diameter than said central portion, the central portion of said other roll terminating adjacent each end in a peripheral portion of larger diameter than its central portion and intermeshing in said annular channels whereby the edge portions of the sheet are displaced from and parallel with the plane of that portion of the sheet extending between said central peripheral portions of the rolls and interconnected by portions of the sheet extending angularly therebetween, and folder plates for completing the folds in the material.

4. In an apparatus for continuously forming sheet material to be cut into relatively short lengths to provide insulators for spool wound coils, a pair of feed rolls for moving the sheet of material, means for forming folds in the sheet spaced inwardly from opposite edge portions thereof comprising a pair of intermeshing bending rolls between which the sheet is drawn by the feed rolls for partially folding the material, said bending rolls each having a central peripheral portion, the central portion of one of said rolls terminating adjacent each end in an annular channel providing peripheral portions of smaller diameter than said central portion, the central portion of said other roll terminating adjacent each end in a peripheral portion of larger diameter than its central portion and intermeshing in said annular channels whereby the edge portions of the sheet are displaced from and parallel with the plane of that portion of the sheet extending between said central peripheral portions of the rolls and interconnected by portions of the sheet extending angularly therebetween, and folder plates for completing the folds in the material, said plates having cooperating spaced tongues between which the partially folded sheet of material is drawn for completing the folds therein.

FRANK MARTINDELL.
CHARLES W. VERRILL.